US012726669B2

(12) United States Patent
Werner

(10) Patent No.: US 12,726,669 B2
(45) Date of Patent: Sep. 1, 2026

(54) VIDEO DISPLAY AMBIENT LIGHTING SYNCHRONISATION

(71) Applicant: WGWG Pty Ltd, Parramatta (AU)

(72) Inventor: William Werner, Parramatta (AU)

(73) Assignee: WGWG PTY LTD, Parramatta (AU)

( * ) Notice: Subject to any disclaimer, the term of this patent is extended or adjusted under 35 U.S.C. 154(b) by 7 days.

(21) Appl. No.: 18/850,403

(22) PCT Filed: Nov. 30, 2023

(86) PCT No.: PCT/AU2023/051231

§ 371 (c)(1), (2) Date: Sep. 24, 2024

(87) PCT Pub. No.: WO2024/119220

PCT Pub. Date: Jun. 13, 2024

(65) Prior Publication Data

US 2025/0211811 A1 Jun. 26, 2025

(30) Foreign Application Priority Data

Dec. 9, 2022 (AU) ................................ 2022903769

(51) Int. Cl.
*H04N 21/41* (2011.01)
*H05B 47/155* (2020.01)
*H05B 47/19* (2020.01)

(52) U.S. Cl.
CPC ....... *H04N 21/4104* (2013.01); *H05B 47/155* (2020.01); *H05B 47/19* (2020.01)

(58) Field of Classification Search
USPC .......................................................... 386/201
See application file for complete search history.

(56) References Cited

U.S. PATENT DOCUMENTS 6,564,108 B1 * 5/2003 Makar .................. H05B 47/155 463/31
9,483,982 B1 * 11/2016 Reddy ...................... H04N 5/64
10,181,299 B1 * 1/2019 Miller .................... G09G 3/001
10,887,552 B1 * 1/2021 Abbas .................. H04M 3/567
10,978,062 B1 * 4/2021 Vanderschaegen .......................... H04N 21/4131

(Continued)

FOREIGN PATENT DOCUMENTS

CN 109874198 A 6/2019

OTHER PUBLICATIONS

International Preliminary Report on Patentability (Chapter II) dated Jul. 12, 2024 from PCT Application No. PCT/AU2023/051231, 6 pages.

(Continued)

*Primary Examiner* — Nigar Chowdhury
(74) *Attorney, Agent, or Firm* — INNOVATION CAPITAL LAW; Vic Lin

(57) ABSTRACT

The described video display ambient lighting synchronisation device integrates a streaming media playback module, a strip controller, and a video output. This device allows seamless coordination between video content and LED lighting, with the streaming media play back module facilitating digital media streaming, the video output transmitting video signals, and the strip controller generating LED strip control signals in synchronisation with the displayed video content.

13 Claims, 1 Drawing Sheet

(56) References Cited

U.S. PATENT DOCUMENTS

| | | | | |
|---|---|---|---|---|
| 2015/0141113 | A1* | 5/2015 | Melnick | G07F 17/3202 463/20 |
| 2016/0292406 | A1* | 10/2016 | Gandhi | G06F 21/32 |
| 2018/0270474 | A1* | 9/2018 | Liu | A61B 5/0064 |
| 2018/0317545 | A1* | 11/2018 | Bavar | A24F 1/32 |
| 2018/0349869 | A1* | 12/2018 | Glaser | G06F 3/0346 |
| 2019/0066573 | A1* | 2/2019 | Hochberg | G09F 19/02 |
| 2019/0087145 | A1* | 3/2019 | Park | G06V 40/103 |
| 2019/0164508 | A1* | 5/2019 | Miller | G09G 3/36 |
| 2020/0192422 | A1* | 6/2020 | Hendren | G02B 6/0088 |
| 2020/0242809 | A1* | 7/2020 | Limburg | G01N 21/8483 |
| 2020/0279123 | A1* | 9/2020 | Takenaka | A61H 3/061 |
| 2022/0182584 | A1* | 6/2022 | Abbas | A61B 5/7267 |
| 2023/0401921 | A1* | 12/2023 | Locke | B67D 1/0857 |
| 2024/0098329 | A1* | 3/2024 | Patel | F21V 33/0056 |

OTHER PUBLICATIONS

International Search Report & Written Opinion dated Feb. 26, 2024 from PCT Application No. PCT/AU2023/051231, 9 pages.

* cited by examiner

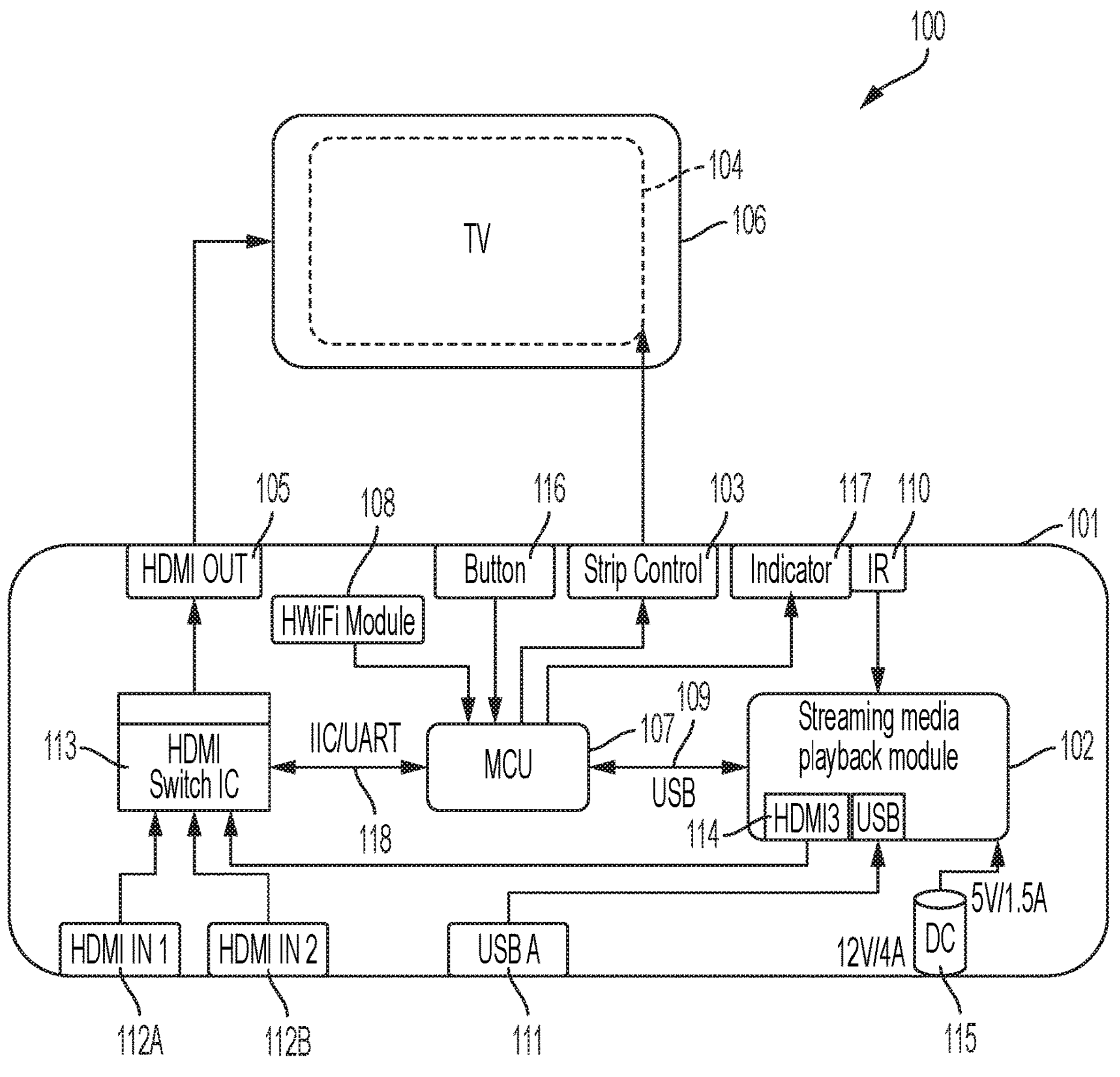
100
TV
104
106
105
108
116
103
117
110
101
HDMI OUT
Button
Strip Control
Indicator
IR
HWiFi Module
113
HDMI
Switch IC
IIC/UART
118
MCU
107
109
USB
Streaming media
playback module
102
114
HDMI3
USB
5V/1.5A
DC
12V/4A
HDMI IN 1
HDMI IN 2
USB A
112A
112B
111
115

VIDEO DISPLAY AMBIENT LIGHTING SYNCHRONISATION

FIELD OF THE INVENTION

This invention relates generally to a video display ambient lighting synchronisation system.

BACKGROUND OF THE INVENTION

Video display ambient lighting synchronisation refers to a technology or system that coordinates the lighting around a video display, such as a television or monitor, with the content being shown on the screen.

The ambient lighting is typically provided by LED strips or lights placed around the display. The synchronisation ensures that the colours and brightness of the ambient lighting match the corresponding elements on the screen in real-time. This enhances the viewing experience by extending the visual effects of the content beyond the display, reducing eye strain, and creating a more immersive and dynamic atmosphere.

The dominant technology in the TV ambient lighting market mainly captures colours from the video content appearing on TVs or monitors. Typically, this involves processing the HDMI signal or using a camera to obtain colour data, which is subsequently transmitted to LED lights through a controller. The purpose of this technology is to synchronize the colour of the LED lights in real-time with the video content, ultimately enhancing the overall viewing experience.

While the present technology has its benefits, it also presents significant drawbacks. A key issue is the separation of streaming media and LED light synchronization, requiring extra transmission components like HDMI cables, thereby complicating the setup. In terms of compatibility and performance, the technology faces hurdles such as signal interruptions, screen glitches, sound delays, and compatibility issues between streaming media playback devices and HDMI video signal capture devices. These challenges notably reduce the efficiency and overall user experience of the technology.

The present invention seeks to provide a way to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a video display ambient lighting synchronisation device which consists of a streaming media playback module and a strip controller and video output that interfaces with the streaming media playback module.

The video output emits video signals from the streaming media playback module, while the strip controller generates LED strip control signals based on the received video signals.

As such, the present system integrates an internal streaming media playback module, smoothly merging video playback with LED lighting control. This integration tackles the challenge of using distinct devices for media streaming and LED synchronisation, streamlining the user experience.

For enhanced compatibility, the system may feature two external HDMI input interfaces and a HDMI switch IC (Integrated circuit) interfacing these external sources and the playback module which enable users to connect external devices and easily switch between content from the internal streaming media playback module or these external sources. A connection between a microcontroller and the HDMI switch IC may be established through a circuit utilizing IIC/UART communication control, thereby further improving compatibility and performance.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows a video display ambient lighting synchronisation device in accordance with an embodiment.

DESCRIPTION OF EMBODIMENTS

FIG. 1 shows a video display ambient lighting synchronisation system 100 in accordance with an embodiment. The system 100 comprises a video display ambient lighting synchronisation device 101.

The device 101 may be provided in a small form factor set-top box-type housing. The device 101 may comprise DC power input 115 for powering the device 101. The device 101 may comprise an operational button 116 such as for turning the device 101 on or off and an operational indicator 117.

The device 101 comprises a streaming media playback module 102. The streaming media playback module 102 is configured to stream digital media from a wide area network (such as the Internet). In embodiments, the streaming media playback module 102 may take the form of an Android TV™ printed circuit board assembly. The streaming media playback module 102 is contain within the housing of the device 101 so that no external video source cable needs to be plugged into the device 101 when streaming content using the streaming media playback module 102.

The device 101 further comprises a LED strip controller 103 configured for operably interfacing a strip of LEDs 104. The device 101 further has a video output 105 operably interfacing the streaming media playback module 102 and a digital display 106. In embodiments, the video output 105 is HDMI compatible.

As is evident from FIG. 1, the strip of LEDs 104 may be placed behind the digital display 106 around the periphery thereof to provide surrounding ambient lighting synchronised with content displayed thereon.

As such, in use, the video output 105 outputs video signals from the streaming media playback module 102 and the strip controller 103 outputs LED strip control signals according to the video signals.

The device 100 may comprise a microcontroller 107 operably interfacing the streaming media playback module 102.

The microcontroller 107 may operably interface a wireless interface 108 (such as a Wi-Fi interface). Furthermore, the microcontroller 107 may further operably interface the streaming media playback model 102 via a serial interface 109, such as a USB interface.

In use, content may be streamed to the streaming media playback module 102 via the serial bus interface 109 and the wireless interface 108. The microcontroller 107 may be configured with an SSID and password credentials to access a Wi-Fi router.

The microcontroller 107 may further be configured to receive control signals via the wireless interface 108. In this regard, the system 100 may further comprise an electronic device (such as a mobile communication device) executing a software application thereon. The software application may display a control interface for the device 101 on a digital display of the electronic device and be in operable communication with the microprocessor 107 via the wireless interface 108.

The microcontroller 107 may be configured to control the strip controller 103 according to received control signals. For example, colour, brightness and operational modes of the strip controller 103 may be controlled wirelessly using the electronic device.

The microcontroller 107 may be further configured to control the streaming media playback module 102 according to received control signals. The control interface of the electronic device may be configured to allow user selection of a streaming media service and have playback controls (for pause, play, skip and the like) and audio controls (volume up, volume down, mute and the like).

In embodiments, the device 100 has an infrared interface 110 operably interfacing the streaming media playback module 102 to allow for direct control of the streaming media playback module 102 with an infrared remote controller provided with the streaming media playback module 102. The device 101 may further comprise a serial bus interface 111 interfacing the streaming media playback module 102. In embodiments shown, the serial bus interface is a USB interface and housing of the device 100 may comprise a USB A-type port therefor.

In embodiments, the device 100 further comprises a video input 112 and a video switch 113. The video switch 113 operably interfaces the streaming media playback module 102, the video input 112 and the video output 105. As is also shown, the streaming media playback module 102 may comprise a video output 114 operably interfacing the video switch 113.

In embodiments, the video input 112 may be HDMI compatible. In this regard, the video switch 113 may be an HDMI switch integrated circuit (IC).

In embodiments, a pair of video inputs 112A and 112B are provided.

Furthermore, the microprocessor 107 may operably control input selection of the video switch 113. As is shown, the device 100 may comprise an IIC (Inter-Integrated Circuit) or UART (Universal Asynchronous Receiver-Transmitter) control interface 118 operably interfacing the microprocessor 107 and the video switch 113.

The microprocessor 107 may be configured for receiving control instructions from the aforedescribed electronic device to control the video input selection of the video switch 113.

As such, in use, a user may connect HDMI cables from other set-top box devices, DVD players and the like directly to the device 101 and use the electronic device to wirelessly control the device 101 switch between either of the video inputs 112A, 112B or the streaming media playback module 102.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A video display ambient lighting synchronisation device comprising:
- a device housing;
- an integral streaming media playback module housed within the device housing and configured to stream media from a streaming media service via a data interface;
- a control interface configured for controlling playback of the streaming media playback module;
- a strip controller housed within the device housing;
- a microcontroller housed within the device housing and operably interfacing the streaming media playback module;
- a video input;
- a video switch integrated circuit operably interfacing the streaming media playback module, the video input, and a video output port, wherein the microcontroller operably interfaces the video switch integrated circuit via an IIC or UART control interface to control input selection of the video switch integrated circuit to selectively output video from the video input or the streaming media playback module; and wherein
- the video output port is configured to connect to a separate, external digital display with LED lights positioned to provide ambient lighting operably interfacing the streaming media playback module, wherein the video output port outputs video signals from the streaming media playback module and the strip controller outputs LED strip control signals to the LED lights according to the video signals.

2. The device as claimed in claim 1, wherein a wireless interface operably interfaces the microcontroller and wherein a serial bus interface operably interfaces the microcontroller and the streaming media playback module and wherein the microcontroller is configured with wireless router access credentials and content is streamed to the streaming media playback module via the serial bus interface and the wireless interface.

3. The device as claimed in claim 1, wherein a wireless interface operably interfaces the microcontroller and wherein the microcontroller is configured to receive control signals from an electronic device via the wireless interface.

4. The device as claimed in claim 3, wherein the microcontroller is configured to control the strip controller according to the control signals.

5. The device as claimed in claim 4, wherein the control signals comprise at least one of colour, brightness and operational mode control of the strip controller.

6. The device as claimed in claim 3, wherein the microcontroller is configured to control the streaming media playback module according to the control signals.

7. The device as claimed in claim 6, wherein the control signals comprise at least one of playback control and audio control of the streaming media playback device.

8. The device as claimed in claim 1, further comprising an infrared interface operably interfacing the streaming media playback module.

9. The device as claimed in claim 1, wherein the device comprises a serial bus interface for the streaming media playback module.

10. The device as claimed in claim 1, wherein the device comprises a pair of video inputs operably interfacing the video switch integrated circuit.

11. The device as claimed in claim 1, wherein a wireless interface operably interfaces the microcontroller and wherein the microcontroller is configured to receive control signals from an electronic device via the wireless interface to control the input selection of the video switch integrated circuit.

12. A system comprising:

a digital display;

a LED strip with LED lights positioned on or around the digital display to provide ambient lighting;

a video display ambient lighting synchronisation device comprising a device housing, the device housing including:

an integral streaming media playback module configured to stream media from a streaming media service via a data interface;

a control interface configured for controlling playback of the streaming media playback module;

a strip controller operably interfacing the streaming media playback module;

a microcontroller operably interfacing the streaming media playback module;

a video input;

a video switch integrated circuit operably interfacing the streaming media playback module, the video input, and a video output port, wherein the microcontroller operably interfaces the video switch integrated circuit via an IIC or UART control interface to control input selection of the video switch integrated circuit to selectively output video from the video input or the streaming media playback module; and the video output port in the integral streaming media playback module configured to connect to the digital display and the LED lights, wherein the digital display is separate from the device housing and is operably connected to the video output port and the LED strip is operably coupled to the strip controller wherein the video output port outputs video signals from the streaming media playback module and the strip controller outputs LED strip control signals to the LED lights according to the video signal.

13. A method comprising:

connecting an LED strip with LED lights positioned on or around a digital display to provide ambient lighting, to a strip controller housed within a device housing of a video display ambient lighting synchronisation device;

connecting the digital display to a video output, wherein the digital display is separate from the device housing;

controlling, via a microcontroller housed within the device housing, input selection of a video switch integrated circuit housed within the device housing via an IIC or UART control interface, the video switch integrated circuit operably interfacing a streaming media playback module, a video input, and the video output, to selectively output video from the video input or the streaming media playback module; and operating the streaming media playback module housed within the device housing to stream content through a port in the streaming media playback module, configured to connect to the digital display and the LED lights, wherein:

the video output outputs video signals from the streaming media playback module, and the strip controller outputs LED strip control signals to the LED lights according to the video signal.

* * * * *